(12) United States Patent
Yoshimura

(10) Patent No.: US 8,816,210 B2
(45) Date of Patent: Aug. 26, 2014

(54) GROMMET

(71) Applicant: Yazaki Corporation, Tokyo (JP)

(72) Inventor: Katsuya Yoshimura, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/943,094

(22) Filed: Jul. 16, 2013

(65) Prior Publication Data

US 2014/0020930 A1 Jan. 23, 2014

Related U.S. Application Data

(63) Continuation of application No. PCT/JP2012/053902, filed on Feb. 14, 2012.

(30) Foreign Application Priority Data

Feb. 14, 2011 (JP) .................................. 2011-029031

(51) Int. Cl.
*H02G 3/22* (2006.01)
*H02G 3/04* (2006.01)
*B60R 16/02* (2006.01)

(52) U.S. Cl.
CPC ............... *H02G 3/22* (2013.01); *H02G 3/0406* (2013.01); *B60R 16/0222* (2013.01)
USPC ................... 174/152 G; 174/650; 174/153 G; 16/2.1; 16/2.2

(58) Field of Classification Search
CPC ............ B60R 16/0215; B60R 16/0207; B60R 16/0222; H02G 3/04; H02G 3/22; H02G 3/24; H02G 3/30; H02G 3/36; H02G 3/0406; F16L 5/00; F16L 5/02

USPC ....... 174/650, 152 R, 152 G, 652, 153 G, 135, 174/142, 137 R, 151, 17 CT; 439/587, 271, 439/272, 273, 274, 275; 16/2.1, 2.2; 248/56
See application file for complete search history.

(56) References Cited

U.S. PATENT DOCUMENTS 6,495,767 B2 * 12/2002 Okuhara et al. .......... 174/153 G
6,760,957 B2 * 7/2004 Nagamine ................. 174/153 G
(Continued)

FOREIGN PATENT DOCUMENTS

JP 3-57824 U 6/1991

OTHER PUBLICATIONS

International Search Report dated Jun. 5, 2012 issued in International Application No. PCT/JP2012/053902 (PCT/ISA/220 & 210).

(Continued)

*Primary Examiner* — Angel R Estrada
(74) *Attorney, Agent, or Firm* — Sughrue Mion, PLLC

(57) ABSTRACT

In a grommet 1 including a grommet main body 11 in which an electrical wire insertion hole 12 through which an electric wire is inserted is provided and in which an annular seal portion 13 which abuts against an opening edge 33 of a panel mounting hole 32 is provided, the annular seal portion 13 includes an inner side annular supporting portion 17, an outer side annular supporting portion 18 integrally formed with the grommet main body 11 at the outer circumference of the inner side annular supporting portions 17, and an arc-shaped abutting portion 16 formed so as arcuately to connect tips 17a and 18a of the inner side annular supporting portion 17 and the outer side annular supporting portion 18 and abuts against the opening edge 33 of the panel mounting hole 32.

3 Claims, 6 Drawing Sheets

(56) References Cited

U.S. PATENT DOCUMENTS

| | | | |
|---|---|---|---|
| 6,901,627 B2 * | 6/2005 | Uchida | 174/135 |
| 6,977,340 B2 * | 12/2005 | Nakamrura | 174/667 |
| 7,189,930 B2 * | 3/2007 | Murakami | 174/650 |
| 7,244,894 B1 * | 7/2007 | Lipp | 174/153 G |
| 7,434,814 B2 * | 10/2008 | Kumakura et al. | 174/153 G |
| 7,615,713 B2 * | 11/2009 | Bardella et al. | 174/153 G |
| 8,108,968 B2 * | 2/2012 | Pietryga et al. | 174/152 G |
| 2003/0226234 A1 | 12/2003 | Katayama | |
| 2006/0243484 A1 | 11/2006 | Serizawa et al. | |

OTHER PUBLICATIONS

Written Opinion dated Jun. 5, 2012 issued in International Application No. PCT/JP2012/053902 (PCT/ISA/237).

* cited by examiner

PRIOR ART

GROMMET

CROSS REFERENCE TO RELATED APPLICATION

This application is a continuation of PCT application No. PCT/JP2012/053902, which was filed on Feb. 14, 2012 based on Japanese Patent Application No. 2011-029031 filed on Feb. 14, 2011, the contents of which are incorporated herein by reference. Also, all the references cited herein are incorporated as a whole.

BACKGROUND OF THE INVENTION

1. Field of the Invention

The present invention relates to a grommet which is mounted in a panel constituting a body of a vehicle and through which electric wire is inserted therein.

2. Description of the Related Art

In the related art, for example, as a grommet which is used when a wire harness is inserted through a mounting hole provided on a panel which constitutes a vehicle body of automobiles or the like, the grommet disclosed in JP-UM-A-3-57824 is suggested.

In the grommet, a gap between the mounting hole provided on the panel and the wire harness is sealed, and intrusion of water or the like is prevented.

FIG. 6 and FIGS. 7 (a) and (b) are views showing a configuration of the grommet in the related art. As shown in FIG. 6 and FIGS. 7 (a) and (b), a grommet 100 is substantially composed of a grommet main body 101 which an electric wire is inserted to the inside of the grommet main body 101, a grommet inner 103 which is connected to a panel 102 of a vehicle body, and a seal portion 104 which abuts against a part of the panel 102 that surrounds a mounting hole provided on the panel 102.

If the grommet 100 is mounted on the panel 102, as shown in FIG. 7(a), the seal portion 104 abuts against the panel 102, and therefore, a gap between the mounting hole and the wire harness is sealed and seal performance is secured.

However, in the grommet 100 of the above-described related art, since the seal portion 104 spreads from the grommet main body 101 to the grommet inner 103 side, as shown in FIG. 7(b), the seal portion 104 is deformed by external factors, a gap A between the seal portion 104 and the panel 102 is generated, and there is possibility in that seal performance is decreased.

SUMMARY OF THE INVENTION

Therefore, the present invention has been made in view of the above-described situation. It is an object of the present invention to provide a grommet which improves reliability of seal performance.

In order to achieve the object, according to an first aspect of the present invention, there is provided a grommet which includes a grommet main body in which an electrical wire insertion hole through which an electric wire is inserted is provided and in which an annular seal portion which abuts against an opening edge of a panel mounting hole is provided, wherein the annular seal portion includes an inner side annular supporting portion, an outer side annular supporting portion which is integrally formed with the grommet main body at the outer circumference of the inner side annular supporting portion, and an arc-shaped abutting portion which is formed so as arcuately to connect tips of the inner side annular supporting portion and the outer side annular supporting portion and abuts against the opening edge of the panel mounting hole.

In the grommet according to a second aspect of the present invention, an inner connection portion to which a grommet inner having an insertion hole communicated with the electric wire insertion hole is connected may be provided in the grommet main body, a flange portion of the grommet inner may abut against the inner connection portion, and a rear end side of the inner side annular supporting portion may abut against the flange portion.

In the grommet according to a third aspect of the present invention, the inner side annular supporting portion and the outer side annular supporting portion have stiffness which can press the arc-shaped abutting portion in a close contact state on the opening edge in the state where the arc-shaped abutting portion abuts against the opening edge of the panel mounting hole, and the arc-shaped abutting portion has a stiffness and can be deformed and stuck in the state of abutting the opening edge.

According to the first aspect of the present invention, since the annular seal portion includes the inner side annular supporting portion, the outer side annular supporting portion, and the arc-shaped abutting portion which is formed so as arcuately to connect tips of the inner side annular supporting portion and the outer side annular supporting portion, deformation of the annular seal portion due to the external factors can be prevented.

Moreover, since the arc-shaped abutting portion abuts against the opening edge of the panel mounting hole, a gap between the annular seal portion and the panel mounting hole is not generated, and therefore, it is possible to prevent water or the like from intruding into the panel hole. Accordingly, a grommet having improved reliability of seal performance can be provided.

According to the second aspect of the present invention, since the rear end side of the inner side annular supporting portion abuts against the flange portion of the grommet inner, reliability of the seal performance is improved, and the thickness of the seal portion can be thinner.

According to the third aspect of the present invention, since the inner side annular supporting portion and the outer side annular supporting portion have a stiffness which can press the arc-shaped abutting portion in a close contact state on the opening edge in the state where the arc-shaped abutting portion abuts against the opening edge of the panel mounting hole, it is possible to prevent the gap between the seal portion and the panel mounting hole from generating due to the fact that the arc-shaped abutting portion is pressed on the opening edge.

Moreover, since the arc-shaped abutting portion has a stiffness and can be deformed and stuck in the state of abutting the opening edge, the arc-shaped abutting portion becomes a closed cross-section if abutting against the opening edge, the gap between the arc-shaped abutting portion and the opening edge is not generated, and seal performance can be improved.

DESCRIPTION OF THE PREFERRED EMBODIMENTS

Hereinafter, a grommet according to embodiments of the present invention will be described with reference to drawings. First, a grommet according to a first embodiment of the present invention will be described with reference to FIG. 1 (a) to FIG. 2(b).

Figure 1A:
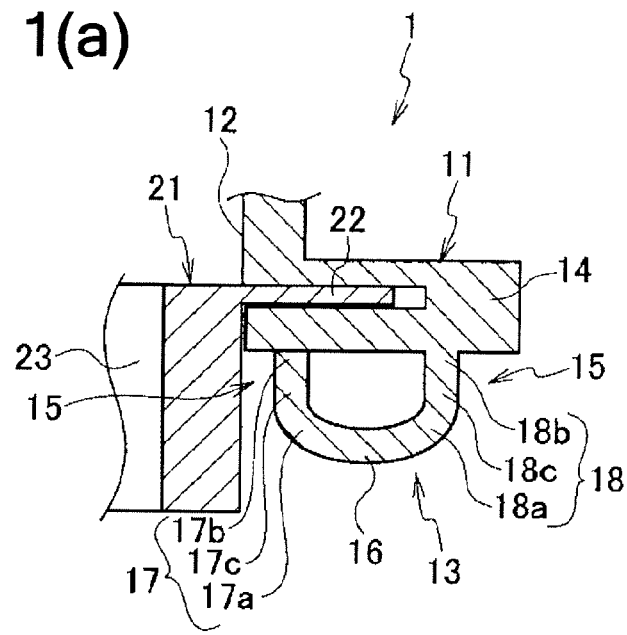
FIGS. 1 (a) and (b) are cross-sectional views showing a grommet according to a first embodiment of the present invention.
Figure 1B:
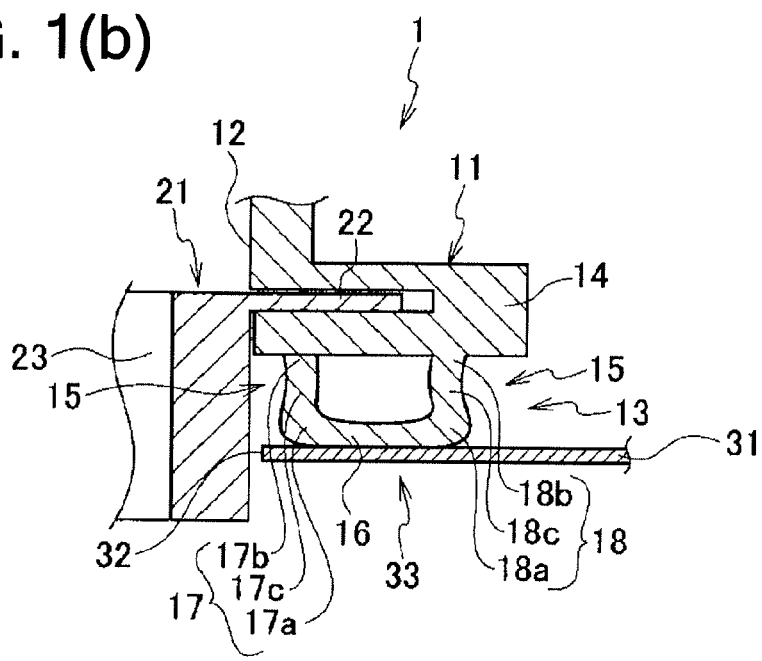
Figure 2A:
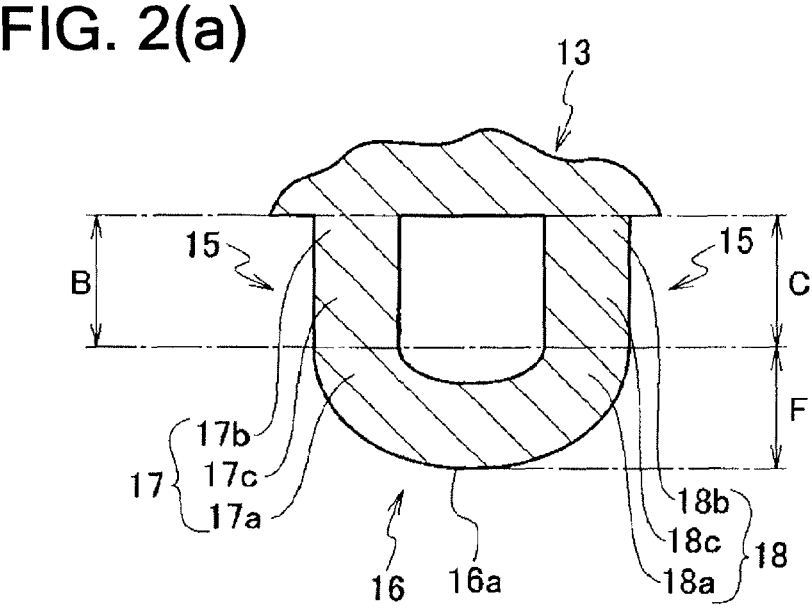
FIGS. 2 (a) and (b) are cross-sectional views showing an annular seal portion of the grommet according to the first embodiment of the present invention.
Figure 2B:
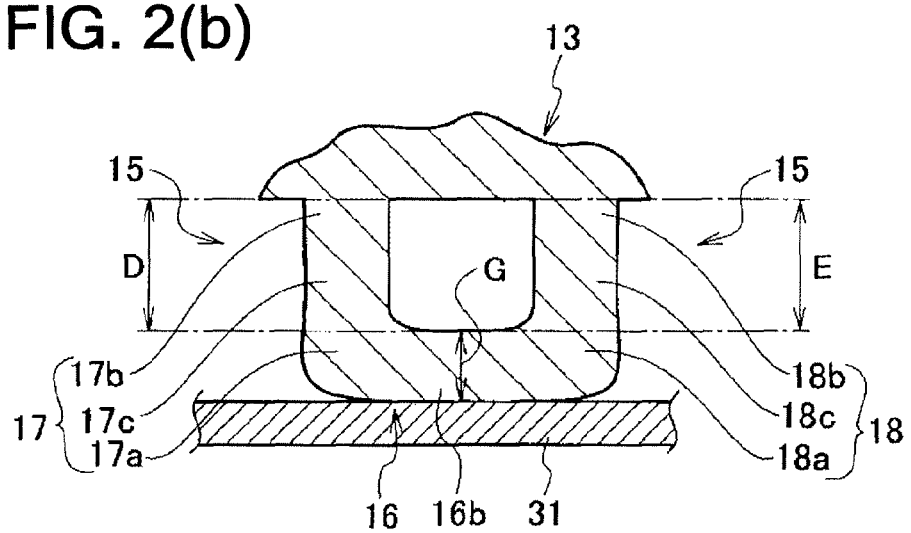

FIG. 1(a) is a cross-sectional view showing the grommet according to the first embodiment of the present invention. FIG. 1(b) is a cross-sectional view showing an abutment state between an annular seal portion and a panel according to the first embodiment of the present invention. FIG. 2(a) is a cross-sectional view showing the annular seal portion before the grommet is mounted according to the first embodiment of the present invention. FIG. 2(b) is a cross-sectional view showing the annular seal portion after the grommet is mounted according to the first embodiment of the present invention.

As shown in FIG. 1(a), the grommet 1 is substantially composed of a grommet main body 11 which is formed of a material having elasticity and a grommet inner 21 which is formed of synthetic resin and connected to the grommet main body 11.

In the grommet main body 11, an electric wire insertion hole 12 through which an electric wire (wire harness) is inserted is provided in the inside of the grommet main body 11, an annular seal portion 13 which abuts against a panel 31 is provided in the outside, and an inner connection portion 14 to which the grommet inner 21 is connected is provided in the inside of the grommet main body 11.

The annular seal portion (seal portion) 13 is provided at the outer circumference of the grommet inner 21 which is provided in the periphery of the grommet 1, and includes a pair of supporting portions 15 which are linearly formed and an arc-shaped abutting portion 16 which arcuately connects the pair of supporting portions 15.

The supporting portion 15 includes an inner side annular supporting portion 17 which is integrally formed with the grommet main body 11 at the outer circumference of the grommet inner 21, and an outer side annular supporting portion 18 which is integrally formed with the grommet main body at the outer circumference of the inner side annular supporting portion 17.

The arc-shaped abutting portion 16 is formed so as to arcuately connect a tip 17a of the inner side annular supporting portion 17 and a tip 18a of the outer side annular supporting portion 18. In addition, a rear end 17b of the inner side annular supporting portion 17 and a rear end 18b of the outer side annular supporting portion 18 are integrally formed of the inner connection portion 14 of the grommet main body 11.

In this way, since the annular seal portion 13 is composed of the inner side annular supporting portion 17 and the outer side annular supporting portion 18 (supporting portion 15), and the arc-shaped abutting portion 16 which is formed so as to arcuately connect the tips 17a and 18a of the inner side annular supporting portion 17 and the outer side annular supporting portion 18, deformation of the annular seal portion 13 due to external factors can be prevented.

A connection flange portion (flange portion) 22, which is provided between the electric wire insertion hole 12 and the seal portion 13 and abuts against the inner connection portion 14 extending to the outer side annular supporting portion 18 side, is provided in the grommet inner 21.

As shown in FIG. 1(b), if the grommet 1 is mounted on a panel mounting hole 32 provided in the panel 31, the arc-shaped abutting portion 16 abuts against an opening edge 33 of the panel mounting hole 32. Thereby, since a gap is not generated between the annular seal portion 13 and the panel mounting hole 32, it is possible to prevent water or the like from intruding into the panel mounting hole 32.

Since the inner side annular supporting portion 17 and the outer side annular supporting portion 18 have stiffness which can press the arc-shaped abutting portion 16 on the opening edge 33 in the state where the arc-shaped abutting portion 16 abuts against the opening edge 33 of the panel mounting hole 32, if the grommet 1 is mounted on the panel mounting hole 32, the arc-shaped abutting portion 16 receives a pressing force by linear portions 17c and 18c of the inner side annular supporting portion 17 and the outer side annular supporting portion 18.

Here, the stiffness which can press means a stiffness of the extent as lengths B and C (refer to FIG. 2(a)) of the linear portions 17c and 18c of the inner side annular supporting portion 17 and the outer side annular supporting portion 18 before the grommet 1 is mounted on the panel mounting hole 32 are substantially the same as lengths D and E (refer to FIG. 2(b)) after the grommet is mounted on the panel mounting hole.

In addition, it is possible to prevent the gap between the annular seal portion 13 and the panel mounting hole 32 from being generated due to the fact that the arc-shaped abutting portion 16 is pressed on the opening edge 33 by the linear portions 17c and 18c of the inner side annular supporting portion 17 and the outer side annular supporting portion 18.

The arc-shaped abutting portion 16 has stiffness and can be deformed and stuck to the opening edge 33 in the state of abutting the edge, and this stiffness is lower than that of the inner side annular supporting portion 17 and the outer side annular supporting portion 18. Thereby, a height F (refer to FIG. 2(a)) of the arc-shaped abutting portion 16 before the grommet 1 is mounted on the panel mounting hole 32 becomes a substantially uniform height G (refer to FIG. 2(b)) which is bent and deformed by the pressing of the inner side annular supporting portion 17 and the outer side annular supporting portion 18 after the grommet is mounted on the panel mounting hole.

That is, since the arc-shaped abutting portion 16 before being mounted has an arc-shape, an arc-shaped tip 16a (refer FIG. 2(a)) of the arc-shaped abutting portion 16 abuts against the panel 31. However, the arc-shaped abutting portion 16 after being mounted is linearly bent and deformed with respect to the panel 31, and therefore, an arc-shaped portion 16b(refer to FIG. 2(b)) of the arc-shaped abutting portion 16 abuts against (is surface contact with) the panel.

As described above, since the arc-shaped abutting portion 16 of the annular seal portion 13 has the stiffness and can be deformed and stick in the state of abutting against the opening edge 33 while having an arc shape, the abutting portion is deformed following the panel 31 while generating a constant repulsive force with respect to the panel 31 and becomes a closed cross-section when the grommet 1 is mounted on the panel 31 and the arc-shaped abutting portion 16 abuts against the panel 31.

Accordingly, the gap between the mounting hole 32 and the grommet 1 is not generated, and seal performance can be improved.

Figure 7A:
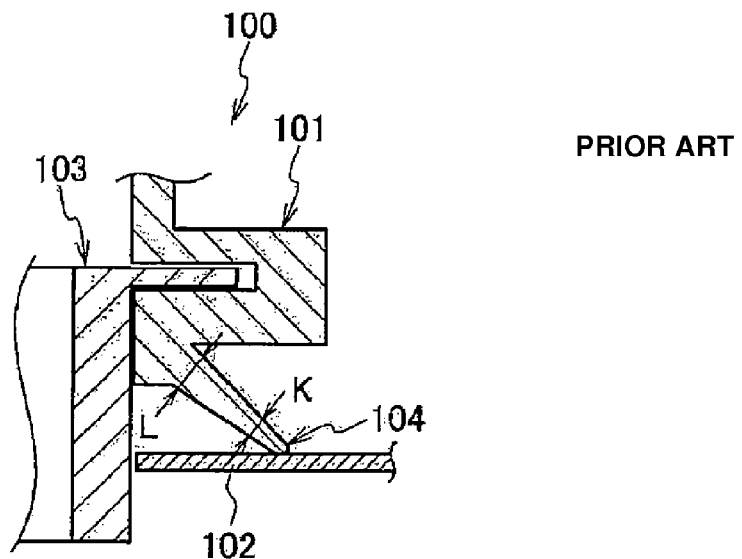
FIGS. 7 (a) and (b) are cross-sectional views showing the grommet in the related art.
Figure 7B:
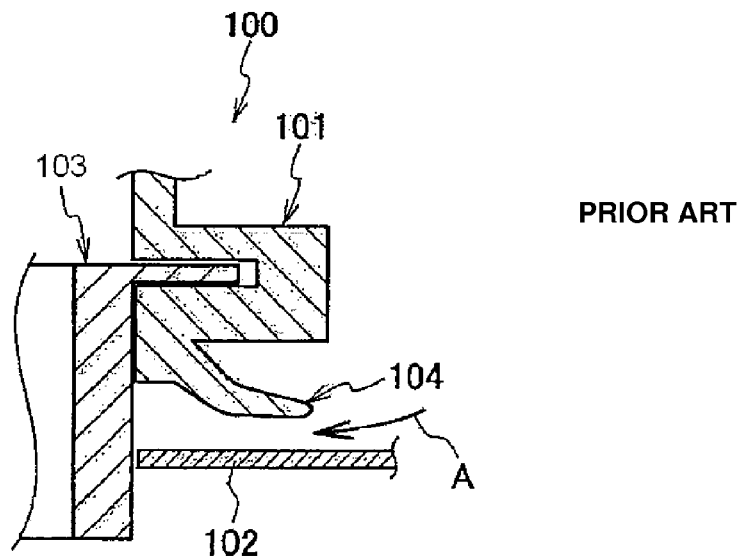

In addition, in the grommet of the related art, since the seal portion is formed so as to spread from the grommet main body toward the grommet inner (refer to FIGS. 7(a) and 7(b)), deformation such as turning-up of the seal portion due to packed state at the time of the transport of the grommet is generated.

However, in the grommet 1 according to the first embodiment of the present invention, since the annular seal portion 13 is composed of the inner side annular supporting portion 17 and the outer side annular supporting portion 18, and the arc-shaped abutting portion 16 which arcuately connects the tips 17a and 18a of the inner side annular supporting portion 17 and the outer side annular supporting portion 18, the gap between annular seal portion 13 and the panel 31 is not generated by the deformation of the annular seal portion 13 due to external factors, and reliability of the seal performance can be improved.

Figure 3A:
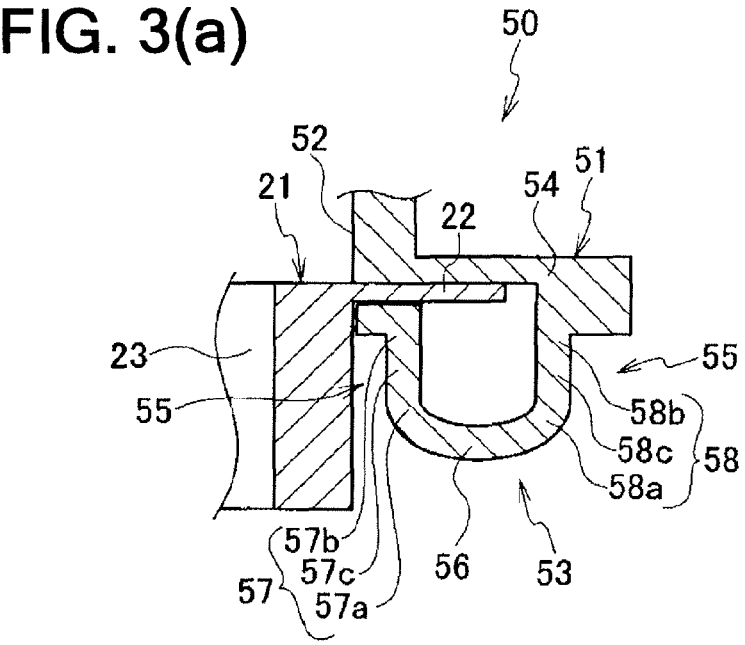
FIGS. 3 (a) and (b) are cross-sectional views showing a grommet according to a second embodiment of the present invention.
Figure 3B:
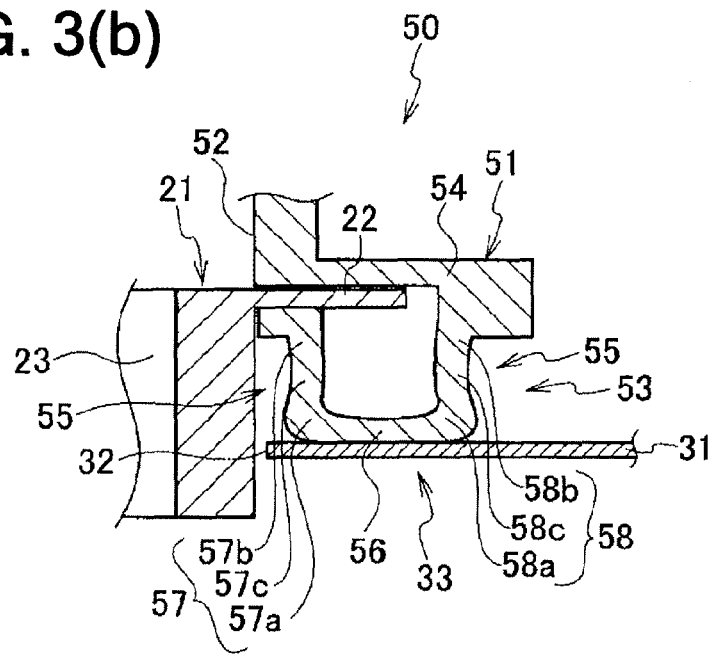

Next, a grommet according to a second embodiment of the present invention will be described with reference to FIGS. 3(a) and 3(b). FIG. 3(a) is a cross-sectional view showing the grommet according to the second embodiment of the present invention. FIG. 3(b) is a cross-sectional view showing the abutting state of the annular seal portion and the panel according to the second embodiment of the present invention.

In addition, since the configuration of the grommet according to the second embodiment is approximately the same as the configuration of the grommet according to the first embodiment of the present invention, the description with respect to the portions of the same configuration is omitted. In addition, the same reference numerals denote the same components as the grommet according to the first embodiment and are described.

As shown in FIG. 3(a), a grommet 50 is substantially composed of a grommet main body 51 formed of a material having elasticity and a grommet inner 21 which is formed of synthetic resin and is connected to the grommet main body 51.

In the grommet main body 51, an electric wire insertion hole 52 through which an electric wire (wire harness) is inserted is provided in the inside of the grommet main body 11, an annular seal portion 53 which abuts against a panel 31 is provided in the outside, and an inner connection portion 54 to which the grommet inner 21 is connected is provided in the inside of the grommet main body 11.

The annular seal portion (seal portion) 53 is provided at the outer circumference of the grommet inner 21 which is provided in the periphery of the grommet main body 51, and includes a pair of supporting portions 55 which is linearly formed, and an arc-shaped abutting portions 56 which arcuately connects the pair of supporting portions 55.

The supporting portion 55 includes an inner side annular supporting portion 57 which is provided at the outer circumference of the grommet inner 21, and an outer side annular supporting portion 58 which is integrally formed with the grommet main body 51 at the outer circumference of the inner side annular supporting portion 57.

The arc-shaped abutting portion 56 is formed so as to arcuately connect a tip 57a of the inner side annular supporting portion 57 and a tip 58a of the outer side annular supporting portion 58. A rear end 57b of the inner side annular supporting portion 57 is provided so as to protrude to the connection flange portion 22 side.

That is, the rear end 57b of the inner side annular supporting portion 57 is connected so as to substantially perpendicular with respect to a linear portion 57c of the inner side annular supporting portion 57 and abuts against the connection flange portion 22 of the grommet inner 21.

In addition, a rear end 58b of the outer side annular supporting portion 58 is integrally formed of the inner connection portion 54 of the grommet body 51.

In this way, the rear end 57b of the inner side annular supporting portion 57 is connected so as to be substantially perpendicular with respect to the linear portion 57c and abuts against the connection flange portion 22 of the grommet inner 21. Therefore, reliability of the seal performance can be improved and the thickness of the seal portion 53 can be thinner.

As shown in FIG. 3(b), if the grommet main body 51 is mounted on the panel mounting hole 32 provided in the panel 31, the arc-shaped abutting portion 56 abuts against an opening edge 33 of the panel mounting hole 32.

The inner side annular supporting portion 57 and the outer side annular supporting portion 58 have stiffness which can press the arc-shaped abutting portion 56 on the opening edge 33 in the state where the arc-shaped abutting portion 56 abuts against the opening edge 33 of the panel mounting hole 32, and the arc-shaped abutting portion 56 has a stiffness and can be deformed and stuck in the state of abutting the opening edge 33.

Thereby, similar to the grommet 1 according to the first embodiment 1, if the grommet 50 is mounted on the panel mounting hole 32, the arc-shaped abutting portion 56 receives the pressing force by the inner side annular supporting portion 57 and the outer side annular supporting portion 58 and comes into surface contact with respect to the panel 31 (refer to FIG. 3(b)).

Figure 4:
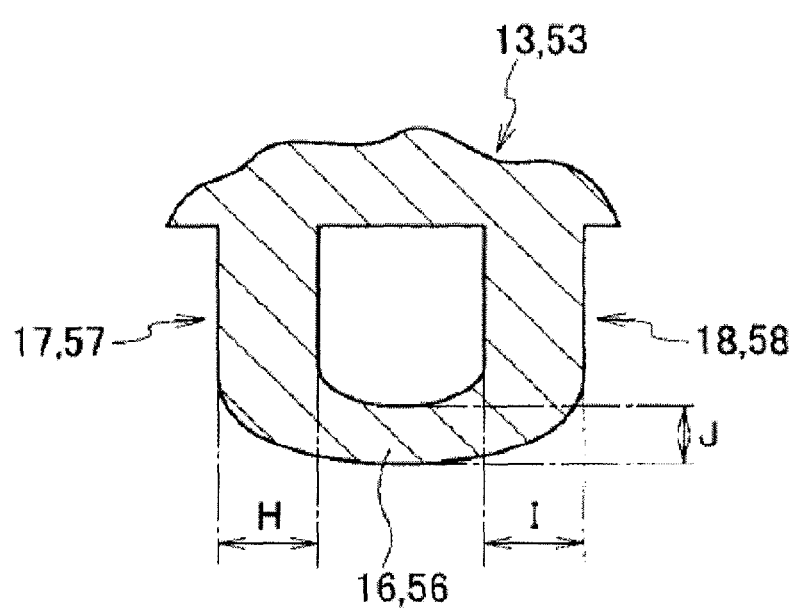
FIG. 4 is a cross-sectional view showing a first modification of the grommet according to the embodiments of the present invention.
Figure 5:
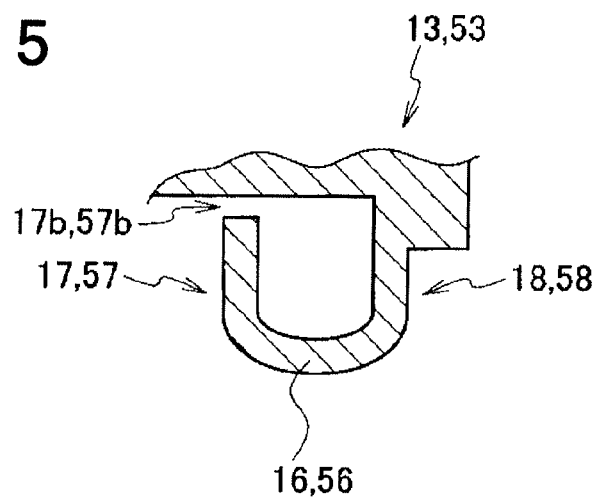
FIG. 5 is a cross-sectional view showing a second modification of the grommet according to the embodiments of the present invention.
Figure 6:
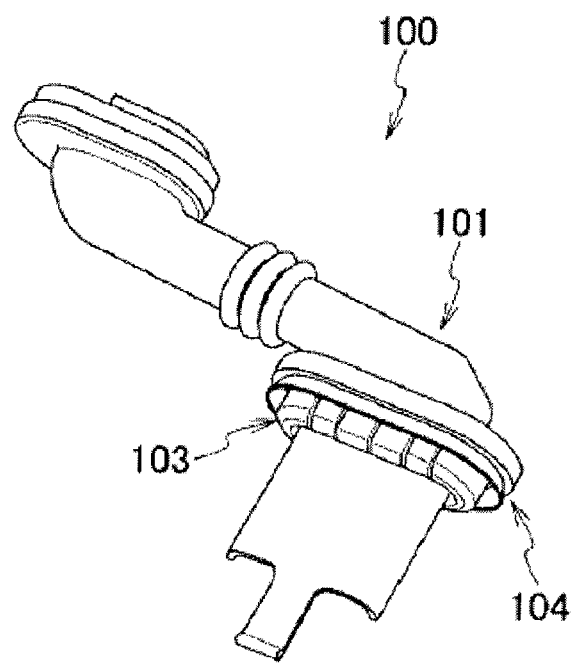
FIG. 6 is a perspective view showing a grommet in the related art.

Next, modifications according to the embodiments of the present invention will be described with reference to FIGS. 4 and 5. FIG. 4 is a view showing a first modification of the annular seal portion according to the embodiments of the present invention. FIG. 5 is a view showing a second modification of the annular seal portion according to the embodiments of the present invention.

In the annular seal portions 13 and 53 of the grommets 1 and 50 according to the above-described embodiments of the present invention, as shown in FIG. 4, a width J of the arc-shaped abutting portions 16 and 56 may be constituted so as to be thinner than a width H and a width I of the pair of linear inside side annular supporting portions 17 and 57 and the outer side annular supporting portions 18 and 58.

In this case, since a constant repulsive force (repulsive force of annular seal portions 13 and 53) can be generated irrespective of the pressing force when the grommets 1 and 50 are mounted on the mounting hole 32, the range of the plate thickness of the applied panel 31 can be set so as to be wider compared to the grommet of the related art, and versatility of the grommets 1 and 50 can be improved.

In addition, in the related art, since the tip width K of the seal portion is thin and the rear end width L of the seal portion is thick (refer to FIG. 7(a)), the insertion force when the panel 102 is pressed up to the rear end of the seal portion is increased. However, in the grommets 1 and 50 according to the embodiments of the present invention, since the width H and the width I of the inner side annular supporting portions 17 and 57 and the outer side annular supporting portions 18 and 58 are constituted so as to be thicker than the width J of the arc-shaped abutting portions 16 and 56, difference of the insertion forces are decreased.

Moreover, in the annular seal portions 13 and 53 of the grommets 1 and 51 according to the above-described embodiments of the present invention, as shown in FIG. 5, the inner side annular supporting portions 17 and 57 which are formed so as to be connected to the arc-shaped abutting portions 16 and 56 separated from the grommet main bodies 11 and 51, and the outer side annular supporting portions 18 and 58 which are integrally formed with the grommet main bodies 11 and 51 at the outer circumference of the inner side annular supporting portions 17 and 57 may constituted.

In this case, the rear ends 17b and 57b of the inner side annular supporting portions 17 and 57 abut against the connection flange portion 22 (refer to FIGS. 1 and 2) of the grommet inner 21. Therefore, reliability of the seal performance is improved and the thickness of the annular seal portions 13 and 53 can be thinner.

Moreover, similar to the grommets 1 and 50 according to the above-described embodiments of the present invention, when the grommets are mounted on the panel 31, since the grommets become a closed cross-section at the time of the abutting of the arc-shaped abutting portions 16 and 56 on the panel 31, the gap between the annular seal portions 13 and 53 and the mounting hole 32 is not generated, and it is possible to prevent water or the like from intruding into the panel mounting hole.

In this way, in the grommets 1 and 50 according to the embodiments of the present invention, the grommets 1 and 50 include the grommet main bodies 11 and 51 in which the electrical wire insertion holes 12 and 52 through which the electric wire is inserted is provided in the inside of the grommet main bodies 11 and 51 and in which the annular seal portions 13 and 53 which abuts against the opening edge 33 of the panel mounting hole 32 is provided in the outside of the grommet main bodies 11 and 51, the annular seal portions (seal portions) 13 and 53 include the inner side annular supporting portions 17 and 57, the outer side annular supporting portions 18 and 58 which are integrally formed with the grommet main bodies 11 and 51 at the outer circumference of the inner side annular supporting portions 17 and 57, and arc-shaped abutting portions 16 and 56 which is formed so as arcuately to connect tips 17a, 18a, 57a, and 58b of the inner side annular supporting portions 17 and 57 and the outer side annular supporting portions 18 and 58 and abuts against the opening edge 33 of the panel mounting hole 32.

Moreover, in the grommets 1 and 50 of the embodiments of the present invention, the inner connection portions 14 and 54 to which the grommet inner 21 having the insertion hole 23 communicated with the electric wire insertion holes 12 and 52 is connected are provided in the grommet main bodies 11 and 51, the connection flange portion (flange portion) 22 of the grommet inner 21 abuts against the inner connection portion 54, and in the grommet 50, the rear end side 57b of the inner side annular supporting portion 57 abuts against the connection flange portion 22.

Moreover, in the grommets 1 and 50 of the embodiments of the present invention, the inner side annular supporting portions 17 and 57 and the outer side annular supporting portions 18 and 58 have stiffness which can press the arc-shaped abutting portion 16 in a close contact state on the opening edge 33 in the state where the arc-shaped abutting portion 16 abuts against the opening edge 33 of the panel mounting hole 32, and the arc-shaped abutting portion 16 has a stiffness and can be deformed and stuck in the state of abutting against the opening edge 33.

According to grommets 1 and 50 of the embodiments of the present invention, since the annular seal portions 13 and 53 include the inner side annular supporting portions 17 and 57, the outer side annular supporting portions 18 and 58, and the arc-shaped abutting portions 16 and 56 which is formed so as arcuately to connect tips 17a, 18a, 57a, and 58a of the inner side annular supporting portions 17 and 57 and the outer side annular supporting portions 18 and 58, deformation of the annular seal portions 13 and 53 due to the external factors can be prevented.

Moreover, since the arc-shaped abutting portions 16 and 56 abut against the opening edge 33 of the panel mounting hole 32, a gap between the annular seal portions 13 and 53 and the panel mounting hole 32 is not generated, and it is possible to prevent water or the like from intruding into the panel hole 32. Accordingly, the grommet 1 and 50 having improved reliability of seal performance can be provided.

Moreover, according to the grommet 50 according to the embodiment of the present invention, since the rear end side 57b of the inner side annular supporting portion 57 abuts against the connection flange portion 22 of the grommet inner 21, reliability of the seal performance is improved, and the thickness of the annular seal portion 53 can be thinner.

In addition, according to the grommets 1 and 50 according to the embodiments of the present invention, since the inner side annular supporting portions 17 and 57 and the outer side annular supporting portions 18 and 58 have stiffness which can press the arc-shaped abutting portions 16 and 56 in a close contact state on the opening edge 33 in the state where the arc-shaped abutting portions 16 and 56 abut against the opening edge 33 of the panel mounting hole 32, it is possible to prevent the gap between the annular seal portions 13 and 53 and the panel mounting holes 33 from generating due to the fact that the arc-shaped abutting portions 16 and 56 are pressed on the opening edge 33.

Moreover, since the arc-shaped abutting portions 16 and 56 have a stiffness and can be deformed and stuck in the state of abutting against the opening edge 33, the arc-shaped abutting portions 16 and 56 become a closed cross-section if abutting against the opening edge 33, and the gap between the arc-shaped abutting portions 16 and 56 and the opening edge 33 is not generated, and seal performance can be improved.

As described above, the grommets of the present invention are described based on the shown embodiments. However, the present invention is not limited thereto, and the configuration of each portion can be replaced with any configuration having the similar function.

For example, in the above-described embodiments, the case is described in which the stiffness of the inner side annular supporting portion 17 and the outer side annular supporting portion 18 has a stiffness of the extent as the length B and the length C (refer to FIG. 2(a)) of the linear portions 17c and 18c of the inner side annular supporting portion 17 and the outer side annular supporting portion 18 before the grommet 1 is mounted on the panel mounting hole 32 are substantially the same as the length D and the length E (refer to FIG. 2(b)) after the grommet is mounted on the panel mounting hole. However, the prevent invention is not limited thereto.

That is, if the arc-shaped abutting portion 16 can be pressed on the opening edge 33 in the state where the arc-shaped abutting portion 16 abuts against the opening edge 33 of the panel mounting hole 32, the length D and the length E (refer to FIG. 2(b)) after the grommet 1 is mounted on the panel mounting hole 32 may be constituted so as to be shorter than the length B and the length C before the grommet is mounted on the panel mounting hole.

Moreover, in the above-described embodiments of the present invention, the case where the rear end 57*b* of the inner side annular supporting portion 57 protrudes the connection flange portion 22 side is described. However, the rear end 57*b* may be provided so as to protrude the outer side annular supporting portion 58 side.

Moreover, in the above-described embodiments of the present invention, the case where the rear end 57*b* of the inner side annular supporting portion 57 is connected so as to be substantially perpendicular to the linear portion 57*c* of the inner side annular supporting portion 57 is described. However, the rear end may be constituted so as to be inclined in a predetermined angle with respect to the linear portion 57*a* if having the shape which abuts against the connection flange portion 22 of the grommet inner 21.

The present invention is very useful in improving reliability of the seal performance of the grommet.

What is claimed is:

1. A grommet which includes:
   a grommet main body in which an electrical wire insertion hole through which an electric wire is inserted is provided; and in which
   an annular seal portion which abuts against an opening edge of a panel mounting hole is provided,
   wherein the annular seal portion includes an inner side annular supporting portion, an outer side annular supporting portion integrally formed with the grommet main body at an outer circumference of the inner side annular supporting portion, and an arc-shaped abutting portion formed so as accurately to connect tips of the inner side annular supporting portion and the outer side annular supporting portion and abuts against the opening edge of the panel mounting hole,
   wherein after the grommet main body is mounted to the panel mounting hole, the arc-shaped abutting portion is linearly bent and deformed so as to abut against the panel,
   wherein the annular seal portion includes an inner space surrounded by the inner side annular supporting portion, the outer side annular supporting portion, and the arc-shaped abutting portion, and
   wherein a grommet inner to which the grommet is attached is not exposed to the inner space.

2. The grommet according to claim 1, wherein an inner connection portion to which a grommet inner having an insertion hole communicated with the electric wire insertion hole is connected is provided in the grommet main body, a flange portion of the grommet inner abuts against the inner connection portion, and a rear end side of the inner side annular supporting portion abuts against the flange portion.

3. The grommet according claim 1, wherein the inner side annular supporting portion and the outer side annular supporting portion have a stiffness which can press the arc-shaped abutting portion in a close contact state on the opening edge in the state where the arc-shaped abutting portion abuts against the opening edge of the panel mounting hole, and the arc-shaped abutting portion has a stiffness and can be deformed and stuck in the state of abutting against the opening edge.

* * * * *